(12) United States Patent
Brockerhoff et al.

(10) Patent No.: US 6,846,775 B1
(45) Date of Patent: Jan. 25, 2005

(54) RECOMBINATOR FOR ELIMINATING HYDROGEN FROM ACCIDENT ATMOSPHERES

(75) Inventors: Peter Brockerhoff, Julich (DE); Werner Von Lensa, Langerwehe (DE); Ernst Arndt Reinecke, Aachen (DE)

(73) Assignee: Forschungszentrum Julich GmbH, Julich (DE)

( * ) Notice: Subject to any disclaimer, the term of this patent is extended or adjusted under 35 U.S.C. 154(b) by 0 days.

(21) Appl. No.: 09/856,024

(22) PCT Filed: Nov. 12, 1999

(86) PCT No.: PCT/EP99/08732

§ 371 (c)(1),
(2), (4) Date: Jul. 6, 2001

(87) PCT Pub. No.: WO00/30121

PCT Pub. Date: May 25, 2000

(30) Foreign Application Priority Data

Nov. 17, 1998 (DE) .......................................... 198 52 953

(51) Int. Cl.[7] .............................. B01J 21/04; G21C 9/00
(52) U.S. Cl. ............................ 502/527.18; 502/527.22; 376/300; 376/301; 422/177
(58) Field of Search ................................ 422/168–183; 376/300, 301; 502/527.18, 527.22

(56) References Cited

U.S. PATENT DOCUMENTS

| | | | |
|---|---|---|---|
| 2,847,284 A | | 8/1958 | Busey |
| 2,943,921 A | * | 7/1960 | Percival ..................... 422/117 |
| 4,992,407 A | | 2/1991 | Chakraborty et al. |
| 5,130,079 A | | 7/1992 | Chakraborty |
| 5,202,303 A | * | 4/1993 | Retallick et al. ............ 502/439 |
| 5,301,217 A | | 4/1994 | Heck et al. |
| 5,328,359 A | * | 7/1994 | Retallick .................... 431/326 |
| 5,495,511 A | | 2/1996 | Chakraborty |
| 5,525,570 A | | 6/1996 | Chakraborty et al. |
| 5,592,521 A | | 1/1997 | Hill |
| 5,643,850 A | | 7/1997 | Chakraborty et al. |
| 5,791,044 A | * | 8/1998 | Whittenberger et al. ...... 29/890 |
| 6,663,379 B2 | * | 12/2003 | Carroni et al. ................ 431/7 |

FOREIGN PATENT DOCUMENTS

| | | | |
|---|---|---|---|
| DE | 38 26 503 | 2/1990 | |
| DE | 39 09 540 | 9/1990 | |
| DE | 41 07 595 | 9/1992 | |
| DE | 196 36 557 | 3/1998 | |
| DE | 197 04 608 | 6/1998 | |
| EP | 0 301 536 | 2/1989 | |
| GB | 858 079 | 1/1961 | |
| WO | WO 30122 A2 * | 5/2000 | ......... G21C/19/317 |
| WO | WO 30123 A1 * | 5/2000 | ......... G21C/19/317 |
| WO | WO 67262 A1 * | 11/2000 | ......... G21C/19/317 |

* cited by examiner

Primary Examiner—Thanh Duong
Assistant Examiner—Tom Duong
(74) Attorney, Agent, or Firm—Frishauf, Holtz, Goodman & Chick, P.C.

(57) ABSTRACT

The invention relates to a catalyst element for a recombinator for eliminating hydrogen from accident atmospheres, in which the technical problem of continuously efficiently converting both small and large amounts of hydrogen with the atmospheric air-oxygen present in the safety containers within a broad concentration range, and routing away the reaction heat arising in the process to such an extent that the respective ignition temperature is not reached in the present mixture is resolved by having the catalyst element exhibit a flat basic body (2), which is arranged within the area of flow through the recombinator, wherein the surface of the basic body (2) over which the accident atmosphere flows has a varying coverage density with catalyst material (3).

19 Claims, 6 Drawing Sheets

RECOMBINATOR FOR ELIMINATING HYDROGEN FROM ACCIDENT ATMOSPHERES

BACKGROUND OF THE INVENTION

1. Field of the Invention

The invention relates to devices that can be used to eliminate released or accidentally formed hydrogen from non-inerted spaces, e.g., safety containers of pressurized water reactors and non-inerted boiling water reactors, which contain steam, air, aerosols and other gases in addition to hydrogen, effectively without backfiring. In this case, the hydrogen can be recombined into steam within the device in the presence of the existing atmospheric oxygen, e.g., in a catalytic procedure.

2. Background Information

During the course of serious accidents, large amounts of hydrogen are formed in light-water reactors (LWR) due to the reduction of steam, which get into the safety containers. The maximal hydrogen amounts in both pressurized and boiling water reactors can measure about 20,000 $m_n^3$. There is also the danger that the atmospheric air in the safety containers (containments) will give rise to flammable mixtures, whose uncontrolled ignition and subsequent detonation places a serious dynamic compressive stress on the containment walls. In addition, steam and hydrogen always lead to pressure and temperature increases in the accident atmosphere. This is particularly significant in boiling water reactors, since their container volumes measure only about 20,000 $m_n^3$, in comparison to 70,000 $m_n^3$ in pressurized water reactors. Pressure and temperature increases result in an additional static stress on the containment walls. Further, leaks owing to excess pressure can give rise to the emission of radiotoxic substances.

Precautionary safety measures involve inerting the gas volumes with nitrogen, as has already been done for boiling water reactors. Catalytic recombinators represent countermeasures that have been discussed and partially implemented already. These are used to exothermally catalytically recombine the formed hydrogen both inside and outside the limits of inflammability, i.e., convert it into steam with the generation of heat. Hydrogen contents with concentrations lying within the limits of inflammability can also be burned off in a conventional manner after spark ignition. However, the resultant processes are not controllable, so that the system-jeopardizing reactions already mentioned above can arise under certain conditions.

In order to eliminate the hydrogen arising during normal operation and as the result of an accident, both thermal and catalytic recombinators were developed, which recombine the hydrogen with the oxygen in the air to form steam. Preference is given to catalytic systems, which operate passively, i.e., are self-starting and need no external power supply, so as to ensure availability during an accident. Substrates used in the known recombinators include metal plates or films as well as highly porous granulate, on which platinum or palladium is applied as the catalyst. Several films and granulate packets (the granulate is held together in packets by wire mesh) are arranged vertically and parallel to each other in sheet casings. The hydrogen/air mixture enters into the casing from below. The reaction starts on the catalytically coated surfaces. The mixture or reaction products stream over the substrate surfaces.

To date, the recombinators have made use of bilaterally coated plates or films and granulate packets. Their surfaces are homogenous, i.e., covered with constant amounts of precious metal. In addition, all catalyst elements are completely coated.

As a result, the dissipation of reaction heat from the systems is basically problematical. It is accomplished almost exclusively via convection from the solid surfaces on the gases streaming past, and heat radiation to neighboring structures. However, excessive hydrogen amounts can cause the coated substrates to become overheated, so that the ignition temperature is reached or exceeded, so that homogenous gas-phase reactions with deflagration or detonation can come about. One other disadvantage lies in the additional heating of the immediate environment of the substrates.

SUMMARY OF THE INVENTION

Therefore, the technical problem of this invention has to do with efficiently converting both small and large amounts of hydrogen with the atmospheric air present in the safety containers in a controlled fashion within a broad concentration range, and routing away the reaction heat arising in the process to such an extent that the respective ignition temperature is not reached in the present mixture.

The technical problem described above is resolved by a catalyst element for a recombinator for eliminating hydrogen from accident atmospheres, which has a flat basic body arranged inside the flow passage area of the recombinator, wherein the surface of the basic body streamed over by the accident atmosphere is covered with varying coverage densities with catalyst material. In this case, it was recognized according to the invention that combining coated with uncoated or more or less coated areas affects both the reaction rates for hydrogen conversion and the cooling of the catalytic substrate. This is because the reaction heat is relayed into the uncoated areas via the heat conduction inside the basic body, and there passed by convection to the as yet unreacted cooler gases of the overflowing gas mixture. As a result, the level of hydrogen conversion can be suitably adjusted, wherein the large amounts of heat that come about during recombination are advantageously limited to a level that prevents the gas mixture of the accident atmosphere from igniting.

The basic body can essentially have any shape desired. However, the basic body is preferably designed as a plate or film, so that the gas mixture streaming over the surface of the basic body flows over a longer area in the coating specially fitted with catalyst material.

The basic body can essentially be at least partially covered by catalyst material on all sides, so that the entire surface of the basic body is optimally adjusted to the conversion of hydrogen. In another embodiment of this invention, the basic body has at least one uncoated and at least one coated side. Therefore, the uncoated side of the basic body can be completely used for dissipating the heat generated by the recombination. This is done on the one hand through heat radiation, and on the other by convection, i.e., by releasing the heat to the gas mixture streaming by.

In a particularly preferred embodiment of this invention, the coverage density with catalyst material on the surface of the basic body increases in the prescribed overflow direction. For this reason, the coverage density with catalyst material is at first slight as the flow streams over the surface of the basic body, since the share of hydrogen in the gas mixture is high, and the object is to keep down the level of hydrogen conversion to prevent excessive heat generation. As the flow continues to stream, the amount of catalyst on the surface rises to increase activity, since the share of hydrogen in the gas mixture tapers off over the running length, and hence the danger of ignition decreases too.

In this case, the surface coverage density also preferably varies continuously, wherein the surface of the basic body has coated sections and uncoated sections in another preferred embodiment of this invention. These sections are preferably strips, wherein the strips can be aligned both transverse and lengthwise to the overflow direction. Another variation of coverage density is achieved by varying the width of the strips in the overflow direction, or by varying the coverage density with neighboring catalyst material coated strips. In addition, the strips aligned along the overflow direction can have a varying, preferably rising coverage density with catalyst material in the longitudinal direction.

As evident from the different embodiments of this invention presented above, the underlying principle of a varying coverage density with catalyst material can be configured in numerous ways.

In addition, it is also possible to provide numerous strip-shaped basic bodies, which are arranged in the flow passage area of the recombinator. These strip-shaped basic bodies can here run along or transverse to the flow direction, wherein the heights and/or coverage density with catalyst material can vary in the strip-shaped basic bodies. While this eliminates a continuous surface along which the gas mixture can flow, the advantage is that areas in which the gas mixture mixes and/or settles come about in the gaps between the strip-shaped basic bodies, thereby resulting in a heat exchange and balancing of hydrogen concentration in the gas mixture.

The above components and those claimed and described in the embodiments to be used according to the invention are subject to no particular exceptional conditions relative to size, shape, material selection and technical concept, so that the selection criteria known in the area of application can be fully applied. Other details, features and advantages of the object of the invention arise from the ensuing description of the accompanying drawings, which depict preferred embodiments of the catalyst element according to the invention as an example.

DETAILED DESCRIPTION OF THE INVENTION

Embodiments relating to coatings for the surface of flat basic bodies will be described below. The arrows indicate the preferred directions in which the stream flows over the basic body. Double arrows indicate that both directions of flow are possible. However, in the case of non-homogenous coatings, only one overflow direction, namely in the direction of greater coverage density, is provided, since the hydrogen concentration in this direction tapers due to continuing recombination.

Figure 1:
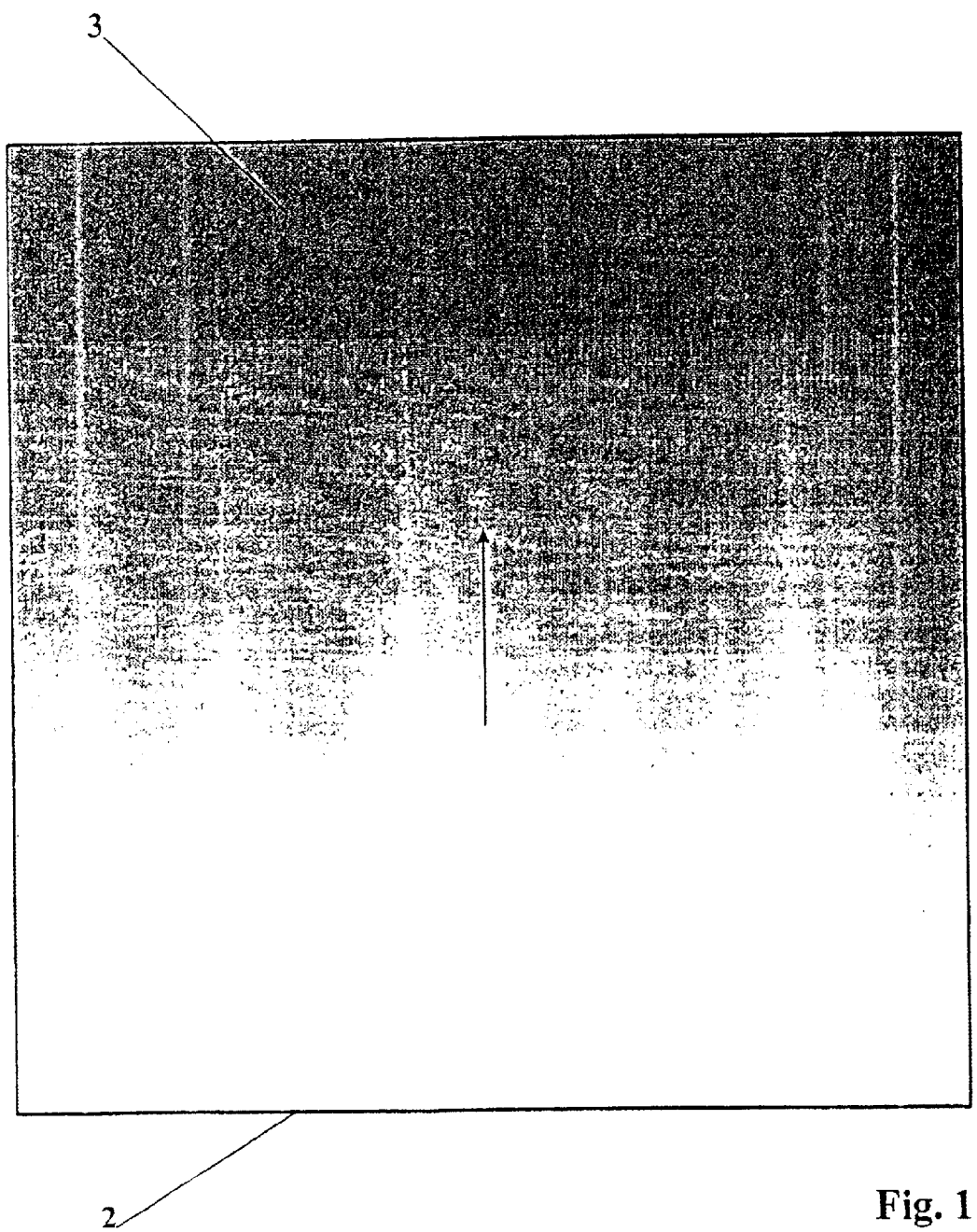
FIG. 1 shows a first embodiment of a catalyst element according to the invention with continuously varying coverage density of catalyst material, uncoated in the inflow area.

FIG. 1 shows the surface of a plate or film 2, which is uncoated in the inlet area, with an increasing amount of catalyst material 3 in the direction of flow. In this case, a slight coverage density is initially used, since the share of hydrogen is high, and the principle of non-ignition through low reaction rates is to be observed. As the stream flows over, the catalyst amount increases in stages or continuously up to a maximal value at the outlet. A residual portion of the diluted mixture can still be decomposed there without an explosion despite higher temperatures, since the share of inerted gas constituents steam and nitrogen increases owing to the increasing oxygen and hydrogen consumption.

Figure 2:
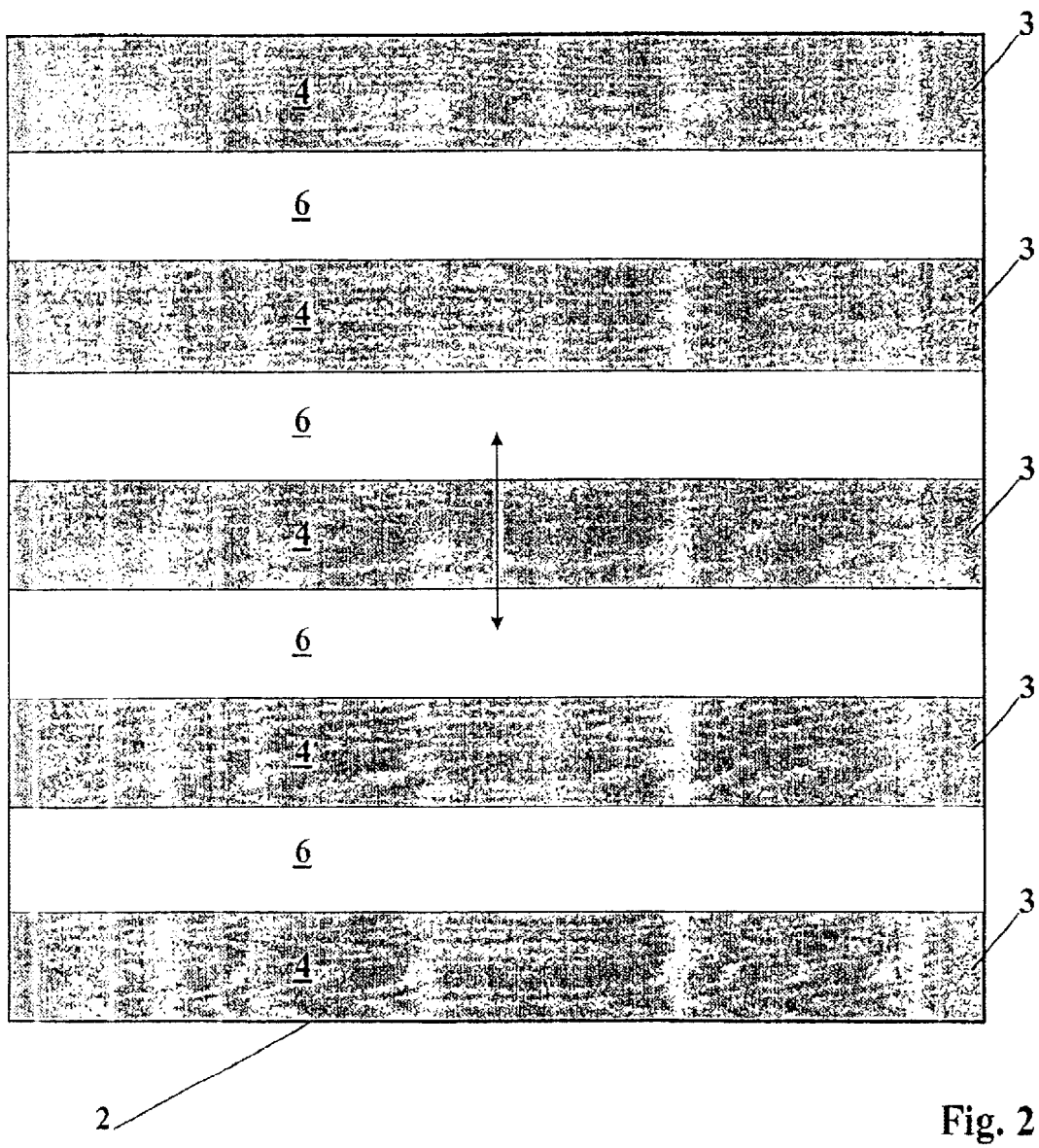
FIG. 2 shows a second embodiment of a catalyst element according to the invention with a strip-shaped surface coated with catalyst material running transverse to the direction of flow.

FIG. 2 shows a strip-coated plate or film 2. The height of the coated and uncoated strips 4 and 6 is adjusted to the desired reaction level, and can also be varied over the running length of the surface. On the uncoated strip 6, a portion of the reaction heat from the preceding strip 4 can be released into the substrate and on the surface. In addition, the free strips 6 are used for mixing the reacted and unreacted portions of the mixture. The back side of the depicted plate or film 2 can be coated in the same manner, or be completely uncoated.

Figure 3:
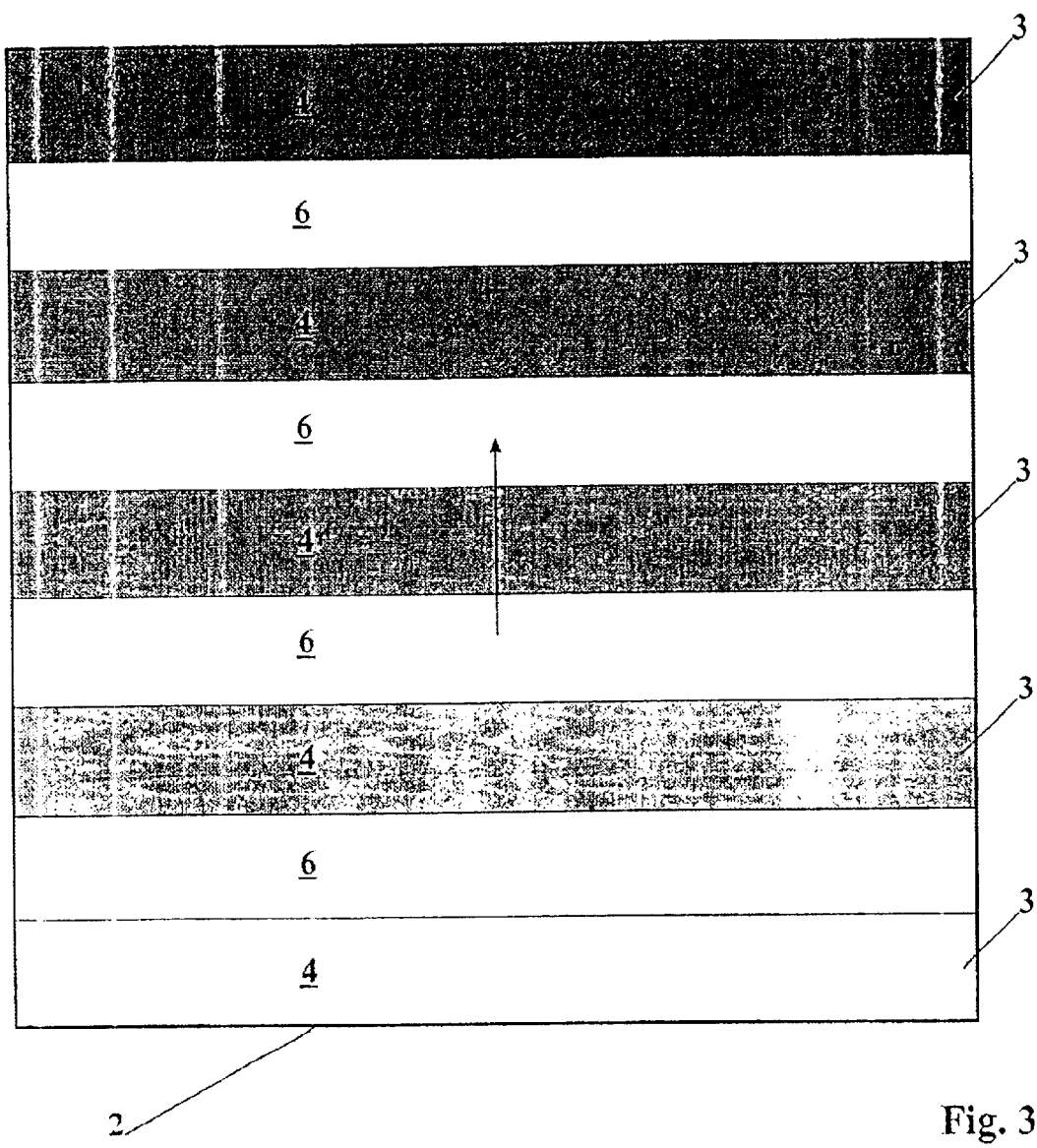
FIG. 3 shows a third embodiment of a catalyst element according to the invention with a strip-shaped coating with catalyst material running transverse to the direction of flow, wherein the coverage density of the strips increases in the direction of flow.

FIG. 3 also shows a strip-coated plate or film. The amount of coating on the strips 4 increases with the running length in the overflow direction.

Figure 4:
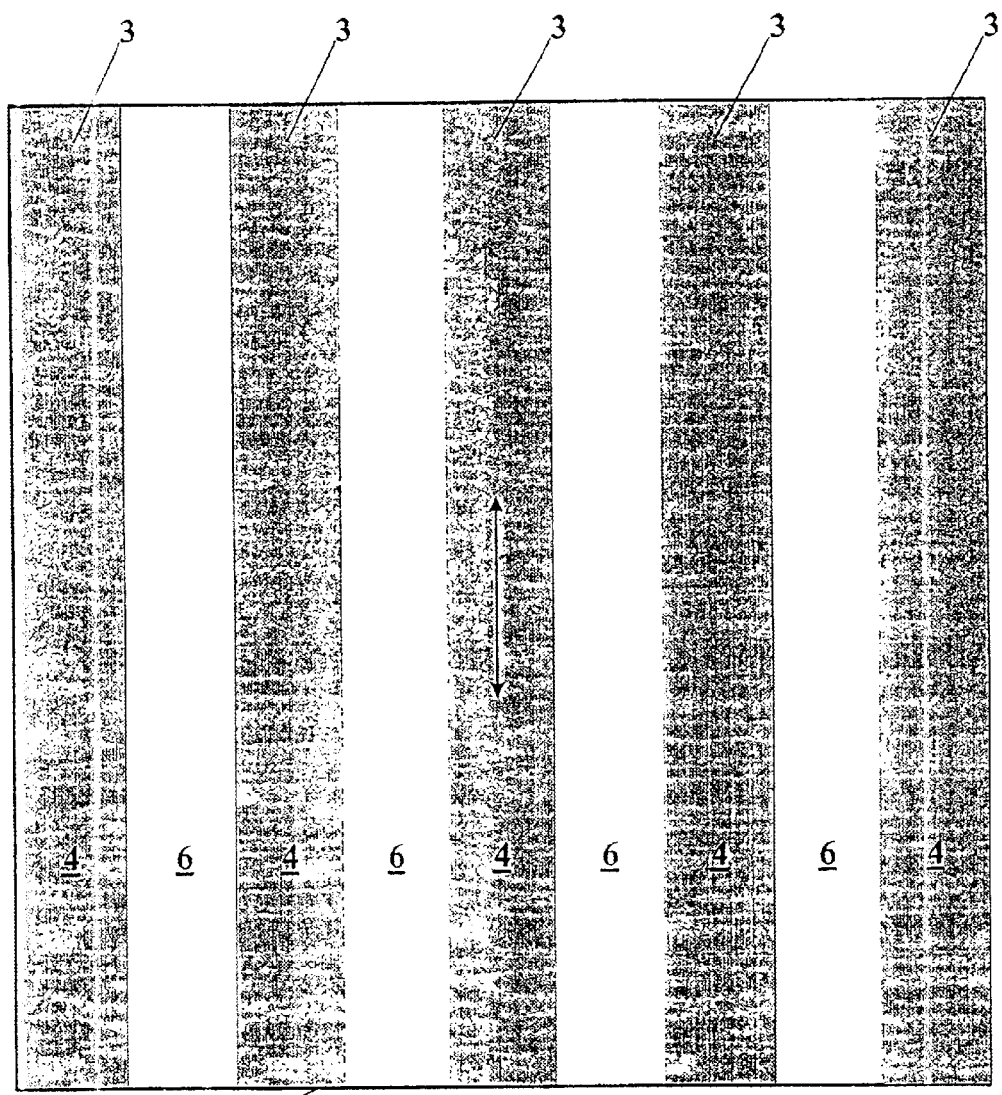
FIG. 4 shows a fourth embodiment of a catalyst element according to the invention with coated strips aligned along the overflow direction.

The embodiment on FIG. 4 shows coated strips 4 aligned in the direction of flow, in whose uncoated gaps, strips 6, a portion of the reaction heat can flow. The coverage density of the strips 4 can here be constant over the running length, or increase with the running length. Along the flow path, the already reacted gases, which contain both hydrogen and nitrogen, mix increasingly with the hydrogen-containing gas routed over the cooling surfaces of the strips 6. Due to the changing concentrations with higher steam contents and lower oxygen contents, the ignitability of the mixture is subject to targeted reductions over the running length.

Figure 5:
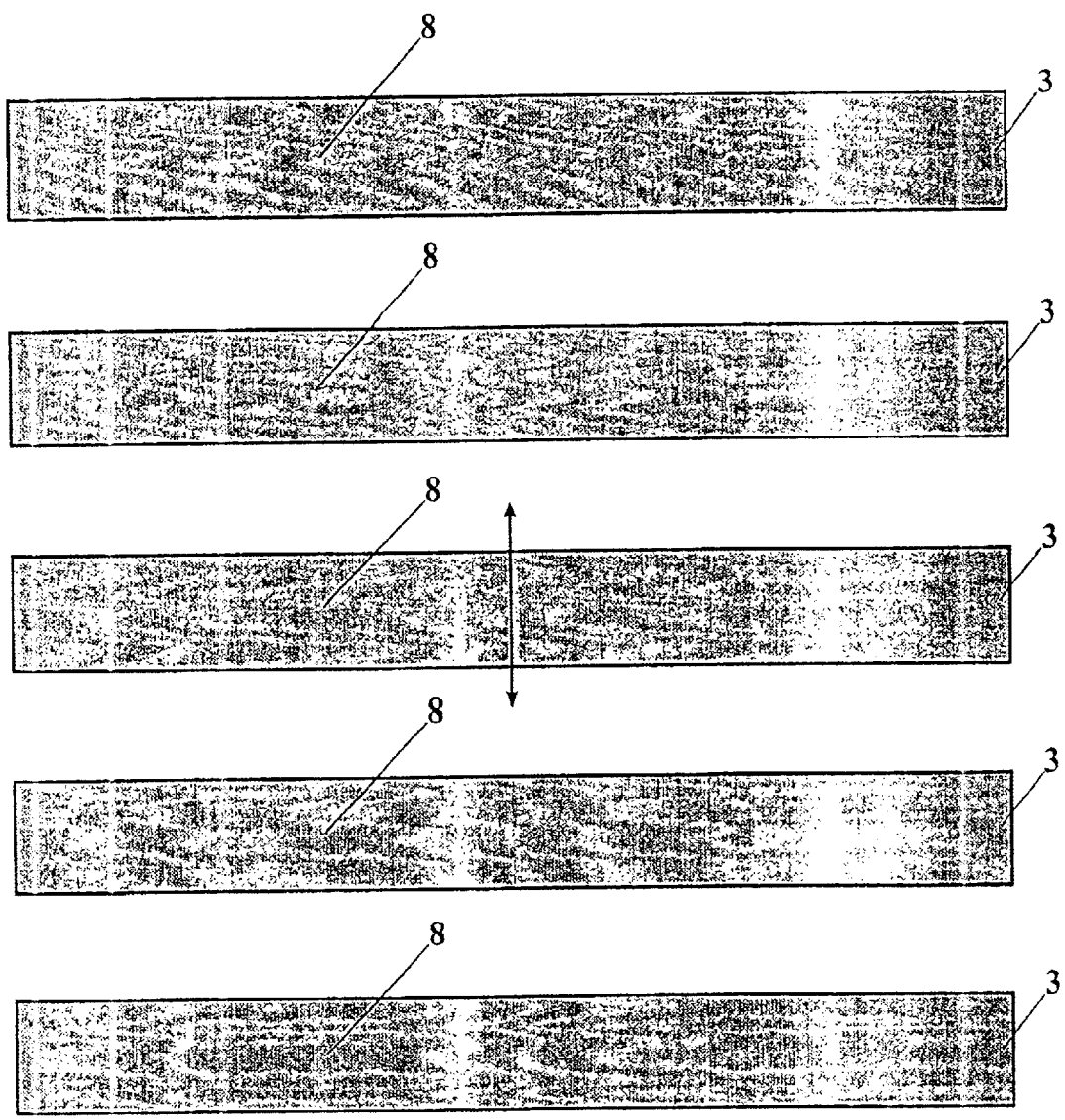
FIG. 5 shows a fifth embodiment of a catalyst element according to the invention with numerous strip-shaped basic bodies coated with catalyst material.

FIG. 5 shows bilaterally or unilaterally coated plate or film strips 8, whose height is freely selectable to reflect the desired reaction level per plate, and can therefore be optimized accordingly. For example, if the heights are reduced down to plate or film thickness, they approach the thickness of a "square" wire, i.e., the catalyst elements then consist only of adjacent, parallel thin structures. If the same arrangement with a circular cross section were to be additionally selected perpendicular thereto, a network would result. The height of the gaps is used to fix the size of the mixing and cooling zones. These gaps can also accommodate coolers to dissipate heat and avoid overheating of respectively ensuing catalytically active strips. For each of these structures, it must be ensured that overheating can be precluded at higher hydrogen contents.

Figure 6:
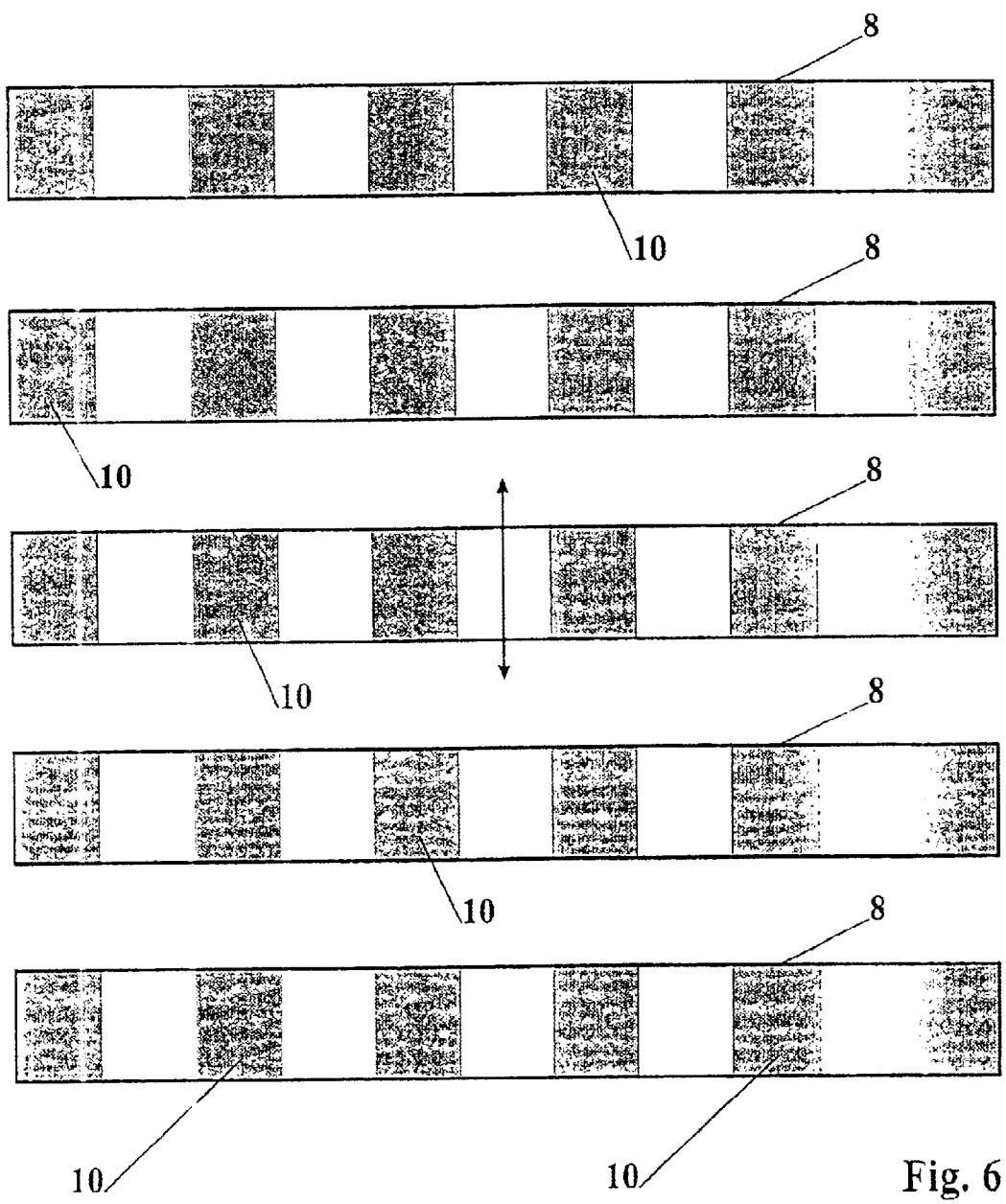
FIG. 6 shows a sixth embodiment of a catalyst element according to the invention with numerous strip-shaped basic bodies whose surfaces are sectionally coated with catalyst material.

FIG. 6 shows a division of coated plate or film strips 8 depicted on FIG. 5. The reaction on the surfaces and heat release through thermal conduction and convection can be controlled over the width of the coating in such a way that overheating cannot take place, and hence ignition temperatures cannot be reached or exceeded. In addition to the embodiment shown on FIG. 6, the coated and uncoated strips of neighboring plate or film strips can be offset relative to each other.

What is claimed is:

1. A recombinator for eliminating hydrogen from an accident atmosphere comprising
a catalyst element having a flat basic body, the flat basic body being arranged inside an area of flow through the recombinator, a surface of the flat body over which the accident atmosphere flows has a varying coverage density of catalyst material, the coverage density increases in the prescribed overflow direction.

2. The recombinator according to claim 1, wherein the coverage density of the catalyst material varies continuously.

3. The recombinator according to claim 2, wherein a front area of the flat basic body in the direction of flow is uncoated.

4. The recombinator according to claim 2, wherein the surface of the flat basic body has coated sections and uncoated sections.

5. The recombinator according to claim 2, wherein a plurality of strip-shaped basic bodies are arranged in the area of flow through the recombinator.

6. The recombinator according to claim 1, wherein the surface of the flat basic body has coated sections and uncoated sections.

7. The recombinator according to claim 6, wherein the surface of the flat basic body has strips comprising coated strips and uncoated strips.

8. The recombinator according to claim 7, wherein the strips run transverse to the overflow direction.

9. The recombinator according to claim 8, wherein the strips have a width which varies in the overflow direction.

10. The recombinator according to claim 9, wherein the coverage density of the catalyst material of neighboring coated strips varies.

11. The recombinator according to claim 8, wherein the coverage density of the catalyst material of neighboring coated strips varies.

12. The recombinator according to claim 7, wherein the coverage density of the catalyst material of neighboring coated strips varies.

13. The recombinator according to claim 7, wherein the strips run along the overflow direction.

14. The recombinator according to claim 13, wherein the coated strips have a varying coverage density of catalyst material in the longitudinal direction.

15. The recombinator according to claim 6, wherein a plurality of strip-shaped basic bodies are arranged in the area of flow through the recombinator.

16. The recombinator according to claim 1, wherein a plurality of strip-shaped basic bodies are arranged in the area of flow through the recombinator.

17. The recombinator according to claim 16, wherein the strip-shaped basic bodies run along or transverse to the direction of flow.

18. The recombinator according to claim 17, wherein at least one of the heights and the coverage densities of the catalyst material of the strip-shaped basic bodies varies.

19. The recombinator according to claim 16, wherein at least one of the heights and the coverage densities of the catalyst material of the strip-shaped basic bodies varies.

* * * * *